United States Patent
Ghani et al.

(10) Patent No.: US 10,218,402 B2
(45) Date of Patent: Feb. 26, 2019

(54) MULTI-SUBSCRIBER IDENTITY MODULE (SIM) CALL SETUP

(71) Applicant: QUALCOMM Incorporated, San Diego, CA (US)

(72) Inventors: Sarfraz Mohammed Ghani, Hyderabad (IN); Mohd Imran, Hyderabad (IN); Rajesh Gopala Krishnan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/590,952

(22) Filed: May 9, 2017

(65) Prior Publication Data
US 2018/0331705 A1   Nov. 15, 2018

(51) Int. Cl.
| H04B 1/3816 | (2015.01) |
| H04L 1/18 | (2006.01) |
| H04W 28/02 | (2009.01) |
| H04W 76/28 | (2018.01) |
| H04W 88/06 | (2009.01) |

(52) U.S. Cl.
CPC ......... *H04B 1/3816* (2013.01); *H04L 1/1812* (2013.01); *H04W 28/0289* (2013.01); *H04W 76/28* (2018.02); *H04W 88/06* (2013.01)

(58) Field of Classification Search
CPC ................................................ H04W 36/0066
See application file for complete search history.

(56) References Cited

U.S. PATENT DOCUMENTS

| 2010/0111023 A1* | 5/2010 | Pelletier ................ H04L 5/0007 370/329 |
| 2011/0096706 A1 | 4/2011 | Ramasamy et al. |
| 2012/0020310 A1* | 1/2012 | Ji .......................... H04W 48/16 370/329 |
| 2012/0140743 A1* | 6/2012 | Pelletier ............ H04W 72/0453 370/335 |
| 2013/0303240 A1 | 11/2013 | Sanka et al. |
| 2014/0169279 A1* | 6/2014 | Song ................... H04W 72/082 370/329 |
| 2014/0362832 A1* | 12/2014 | Rudolf .................. H04L 1/1822 370/336 |
| 2015/0043473 A1* | 2/2015 | Kim ...................... H04L 1/1812 370/329 |
| 2015/0057046 A1 | 2/2015 | Challa et al. |
| 2015/0092708 A1 | 4/2015 | Su et al. |
| 2015/0163801 A1* | 6/2015 | Sadek ............... H04W 72/0446 370/336 |
| 2015/0257041 A1* | 9/2015 | Su ..................... H04W 36/0016 455/437 |

(Continued)

Primary Examiner — Cindy Trandai
(74) Attorney, Agent, or Firm — Paradice and Li LLP (57) ABSTRACT

Apparatus and methods for method for a wireless communication device having a first Subscriber Identity Module (SIM) enabling a first subscription and a second SIM enabling a second subscription to manage communications over the first subscription and the second subscription, including but not limited to determining an error rate associated with the first subscription or a network congestion parameter associated with the first subscription and determining to skip at least one page decode on the second subscription based on the error rate associated with the first subscription or the network congestion parameter associated with the first subscription.

21 Claims, 8 Drawing Sheets

(56) References Cited

U.S. PATENT DOCUMENTS

| | | | |
|---|---|---|---|
| 2015/0257099 A1* | 9/2015 | Su | H04W 52/0216 455/452.1 |
| 2015/0282209 A1* | 10/2015 | Shao | H04W 72/14 370/329 |
| 2015/0289141 A1* | 10/2015 | Ghasemzadeh | H04W 16/14 370/330 |
| 2015/0296384 A1* | 10/2015 | Sadek | H04W 16/14 455/452.1 |
| 2015/0334553 A1* | 11/2015 | Yang | H04L 1/1854 455/552.1 |
| 2016/0119896 A1* | 4/2016 | Jujaray | H04W 76/38 455/458 |
| 2016/0134317 A1* | 5/2016 | Hu | H04B 1/3816 455/558 |
| 2016/0191375 A1* | 6/2016 | Gopala Krishnan | H04L 45/22 370/217 |
| 2016/0204908 A1 | 7/2016 | Rafique et al. | |
| 2016/0205663 A1* | 7/2016 | Shauh | H04W 60/005 370/312 |
| 2016/0234750 A1* | 8/2016 | Damji | H04W 36/30 |
| 2017/0070940 A1* | 3/2017 | Handa | H04W 40/02 |
| 2017/0127316 A1* | 5/2017 | Chen | H04W 28/06 |
| 2017/0289964 A1* | 10/2017 | Lin | H04L 1/08 |
| 2017/0303136 A1* | 10/2017 | Park | H04W 16/14 |
| 2018/0020464 A1* | 1/2018 | Liang | H04W 76/28 |
| 2018/0062796 A1* | 3/2018 | Feng | H04L 1/1812 |
| 2018/0234878 A1* | 8/2018 | Anand | H04W 28/0289 |
| 2018/0279169 A1* | 9/2018 | Wang | H04L 1/1809 |

* cited by examiner

MULTI-SUBSCRIBER IDENTITY MODULE (SIM) CALL SETUP

BACKGROUND

A wireless communication device, such as a mobile phone device or a smart phone, may include two or more Subscriber Identity Modules (SIMs). Each SIM may correspond to at least one subscription via one or more Radio Access Technologies (RATs). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), High-Speed Downlink Packet Access (HSDPA), and the like), Global System for Mobile Communications (GSM), Code Division Multiple Access1x Radio Transmission Technology (1x), General Packet Radio Service (GPRS), Wi-Fi, Personal Communications Service (PCS), and other protocols that may be used in a wireless communications network or a data communications network.

Two or more subscriptions enabled for a wireless communication device can share a same set of Radio Frequency (RF) resource, such as a shared RF radio. During usage of the wireless communication device, a first subscription (e.g., a data subscription that is in a connected mode) may use the shared RF resource for active data transfer while a second subscription (e.g., an idle subscription) may be idle and may use the RF resource for idle-mode processes such as page decode. To allow efficient utilization of the shared RF resource and to enhance user experience, Adaptive Page Skipping (APS) can be implemented to skip the page decode on the idle subscription (e.g., in alternating Discontinuous Reception (DRX) cycles) as a response to the data subscription demanding additional data throughput for the active data transfer.

Typically, a voting scheme is implemented to enable APS. For example, APS can be enabled in response to both the data subscription (e.g., a LTE/WCDMA subscription) and the idle subscription (e.g., a WCDMA subscription) voting "APS ON." In some exemplary implementations, the idle subscription votes "APS ON" if the DRX cycle is short (e.g., shorter than 640 ms for WCDMA), and the data subscription votes "APS ON" depending on uplink data thresholds (e.g., a Transport Block Size (TBS) threshold) and downlink data thresholds (e.g., a data schedule threshold). APS is considered to be especially useful in improving efficiency associated with utilization of the shared RF resource as the idle subscription performs page decodes for a relatively longer period of time and the paging DRX cycle is relatively shorter.

In some scenarios in which the thresholds are crossed for the data subscription in either downlink or uplink, data throughput for the data subscription is not realized because the wireless communication device is experiencing unfavorable radio condition or network congestion. In such scenarios, page decode for the idle subscription is compromised without the intended gain in performance for the data subscription.

SUMMARY

In some examples, a method for a wireless communication device having a first Subscriber Identity Module (SIM) enabling a first subscription and a second SIM enabling a second subscription to manage communications over the first subscription and the second subscription, the method includes determining at least one of an error rate associated with the first subscription or a network congestion parameter associated with the first subscription, and determining to skip at least one page decode on the second subscription based on the at least one of the error rate associated with the first subscription or the network congestion parameter associated with the first subscription.

In some examples, the error rate associated with the first subscription is an uplink Block Error Rate (BLER).

In some examples, the network congestion parameter associated with the first subscription is a number of deactivated Automatic Repeat Request (HARQ) Identification(s) (ID(s)) deactivated by a first network associated with the first subscription.

In some examples, determining the network congestion parameter associated with the first subscription includes receiving the deactivated HARQ ID(s) from the first network.

In some examples, the first subscription is in a connected mode, and the second subscription is an idle mode.

In some examples, the first subscription and the second subscription share Radio Frequency (RF) resource of the wireless communication device.

In some examples, determining to skip the at least one page decode on the second subscription based on the at least one of the error rate associated with the first subscription or the network congestion parameter associated with the first subscription includes determining to skip the at least one page decode on the second subscription in response to determining that the error rate associated with the first subscription is below an error rate threshold.

In some examples, determining to skip the at least one page decode on the second subscription based on the at least one of the error rate associated with the first subscription or the network congestion parameter associated with the first subscription includes determining to skip the page decode on the second subscription in response to determining that the network congestion parameter associated with the first subscription is below a network congestion parameter threshold.

In some examples, the method further includes determining an uplink Transport Block Size (TBS) associated with the first subscription in uplink, or determining a data schedule associated with the first subscription in downlink.

In some examples, the at least one of the error rate associated with the first subscription or the network congestion parameter associated with the first subscription is determined in response to determining that the uplink TBS associated with the first subscription crosses an uplink TBS threshold.

In some examples, the at least one of the error rate associated with the first subscription or the network congestion parameter associated with the first subscription is determined in response to determining that the data schedule associated with the first subscription crosses a data schedule threshold.

In some examples, determining to skip the at least one page decode on the second subscription based on the at least one of the error rate associated with the first subscription or the network congestion parameter associated with the first subscription includes determining to skip the at least one page decode scheduled in at least one Discontinuous Reception (DRX) cycle of the second subscription.

In some examples, the method further includes allowing page decode on the second subscription without skipping in response to determining that the error rate associated with the first subscription exceeds an error rate threshold.

In some examples, the method further includes allowing page decode on the second subscription without skipping in response to determining that the network congestion parameter associated with the first subscription exceeds a network congestion parameter threshold.

According to some examples, a wireless communication device includes at least one RF) resource, a processor coupled to the at least one RF resource, configured to connect to a first SIM associated with a first RAT and to a second SIM associated with a second RAT, and configured with processor-executable instructions to determine an error rate associated with the first subscription or a network congestion parameter associated with the first subscription, and determine to skip at least one page decode on the second subscription based on the error rate associated with the first subscription or the network congestion parameter associated with the first subscription and, a memory.

In some examples, the error rate associated with the first subscription is an uplink BLER.

In some examples, the network congestion parameter associated with the first subscription is a number of deactivated HARQ IDs deactivated by a first network associated with the first subscription.

In some examples, determining the network congestion parameter associated with the first subscription includes receiving the deactivated HARQ ID(s) from the first network.

In some examples, the first subscription is in a connected mode, and the second subscription is an idle mode.

In some examples, the first subscription and the second subscription share RF resource of the wireless communication device.

In some examples, determining to skip the at least one page decode on the second subscription based on the at least one of the error rate associated with the first subscription or the network congestion parameter associated with the first subscription includes determining to skip the at least one page decode on the second subscription in response to determining that the error rate associated with the first subscription is below an error rate threshold.

In some examples, determining to skip the at least one page decode on the second subscription based on the at least one of the error rate associated with the first subscription or the network congestion parameter associated with the first subscription includes determining to skip the page decode on the second subscription in response to determining that the network congestion parameter associated with the first subscription is below a network congestion parameter threshold.

In some examples, the processor is further configured to determine an uplink TBS associated with the first subscription in uplink, or determine a data schedule associated with the first subscription in downlink.

In some examples, the at least one of the error rate associated with the first subscription or the network congestion parameter associated with the first subscription is determined in response to determining that the uplink TBS associated with the first subscription crosses an uplink TBS threshold.

In some examples, the at least one of the error rate associated with the first subscription or the network congestion parameter associated with the first subscription is determined in response to determining that the data schedule associated with the first subscription crosses a data schedule threshold.

In some examples, determining to skip the at least one page decode on the second subscription based on the at least one of the error rate associated with the first subscription or the network congestion parameter associated with the first subscription includes determining to skip the at least one page decode scheduled in at least one DRX cycle of the second subscription.

In some examples, the processor is further configured to allow page decode on the second subscription without skipping in response to determining that the error rate associated with the first subscription exceeds an error rate threshold.

In some examples, the processor is further configured to allow page decode on the second subscription without skipping in response to determining that the network congestion parameter associated with the first subscription exceeds a network congestion parameter threshold.

In some examples, a method for a wireless communication device having a first SIM)enabling a first subscription and a second SIM enabling a second subscription to manage communications over the first subscription and the second subscription, the method includes means for determining at least one of an error rate associated with the first subscription or a network congestion parameter associated with the first subscription, and means for determining to skip at least one page decode on the second subscription based on the at least one of the error rate associated with the first subscription or the network congestion parameter associated with the first subscription.

According to various examples, a non-transitory computer-readable medium includes computer-readable instructions such that, when executed, causes a processor to execute a method, the method includes determining at least one of an error rate associated with the first subscription or a network congestion parameter associated with the first subscription, and determining to skip at least one page decode on the second subscription based on the at least one of the error rate associated with the first subscription or the network congestion parameter associated with the first subscription.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

A modern communication device, referred to herein as a wireless communication device, User Equipment (UE), or Mobile Station (MS), may include one or more of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide access to one or multiple separate mobile communication networks. The access to mobile communication networks may be facilitated by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), High-Speed Downlink Packet Access (HSDPA), and the like), Global System for Mobile Communications (GSM), Code Division Multiple Access 1x Radio Transmission Technology (1x), General Packet Radio Service (GPRS), Wi-Fi, Personal Communications Service (PCS), and other protocols that may be used in a wireless communications network or a data communications network. Each RAT may be associated with a subscription or SIM.

A multi-SIM wireless communication device connected to two or more networks with one SIM being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when a third one is in use. In other examples, the MSMS communication device may be other suitable multi-SIM communication devices, with, for example, four or more SIMs, such that when one is in use, the others may be deactivated.

On the other hand, a multi-SIM wireless communication device connected to two or more networks with two or more SIMs being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein are applicable to a MSMS wireless communication device (e.g., a DSDS device) having Radio Frequency (RF) resource shared by a first SIM and a second SIM. The examples can be likewise implemented for a MSMA wireless communication device that pauses activities of the first subscription due to blanking pattern, power back-off, interference, and/or the like on the second subscription.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless communication device on a network and enable communication services with the network. A SIM as referred to herein may be a physical SIM, virtual SIM, soft SIM, or the like. Because the information stored in a SIM may be used to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Examples described herein relate to apparatus and methods for intelligently scheduling communications over a first subscription (provided by the first SIM) and a second subscription (provided by the second SIM) of a wireless communication device. In some examples, the first subscription (e.g., a data subscription) may be in a connected mode and may be actively transferring data, and a second subscription (e.g., an idle subscription) is performing idle-mode processes such as page decoding. Generally, the wireless communication device determines whether improved data throughput with respect to the data subscription can be achieved when one or more page decodes for the idle subscription are skipped. For instance, whether data throughput with respect to the data subscription can be achieved may depend on an error rate (e.g., uplink Block Error Rate (BLER)) associated with the data subscription and/or a network congestion parameter (e.g., a number of deactivated Automatic Repeat Request (HARQ) Identification(s) (ID(s)) associated with the data subscription.

Specifically, the wireless communication device may determine whether the uplink Transport Block Size (TBS) of the data subscription is above a TBS threshold. The TBS being above the threshold indicates that the data subscription may need additional data throughput. In response to determining that the TBS for the data subscription exceeds the TBS threshold, the wireless communication device may determine one or more of (1) whether the uplink BLER for the data subscription exceeds an uplink BLER threshold; or (2) whether the number of deactivated HARQ IDs exceeds a HARQ ID threshold. In response to determining that the uplink BLER exceeds the uplink BLER threshold or in response to determining that the number of deactivated HARQ IDs exceeds the HARQ ID threshold, the wireless communication device may not skip any scheduled page decode on the idle subscription. That is, scheduled page decodes on the idle subscription are allowed in every Discontinuous Reception (DRX) cycle.

On the other hand, in response to determining that the uplink BLER does not exceed the uplink BLER threshold and that the number of deactivated HARQ IDs does not exceed the HARQ ID threshold, the wireless communication device may skip at least one page decode on the idle subscription in an alternating fashion. In some instances, Adaptive Page Skipping (APS) may be implemented to skip the scheduled page decode(s). In some examples, a page decode scheduled for a DRX cycle out of every N number of DRX cycles may be skipped. The number N may be determined based on the uplink BLER and/or the number of deactivated HARQ IDs. For instance, N may increase as the uplink BLER or the number of deactivated HARQ IDs increases, given that increasing uplink BLER or the number of deactivated HARQ IDs indicates less throughput gain for the data subscription, due to unfavorable channel conditions associated with the data subscription. This is because the uplink BLER in field scenarios is commonly observed to be at around 10%-15% in normal radio conditions, and the network can deactivate as many as 7 out of 8 HARQ IDs due to network congestion. It has been observed that each deactivated HARQ ID can degrade the data throughput of the data subscription for about 12.5%.

Accordingly, examples presented herein allow efficient usage of the RF resource especially if the RF resource is shared between the data and idle subscription, by intelligently skipping scheduled decodes on the idle subscription. Upon determination of favorable channel conditions (e.g., small BLER and few deactivated HARQ IDs) on the data subscription, scheduled page decodes on the idle subscription are skipped to improve data throughput of the data subscription.

Figure 1:
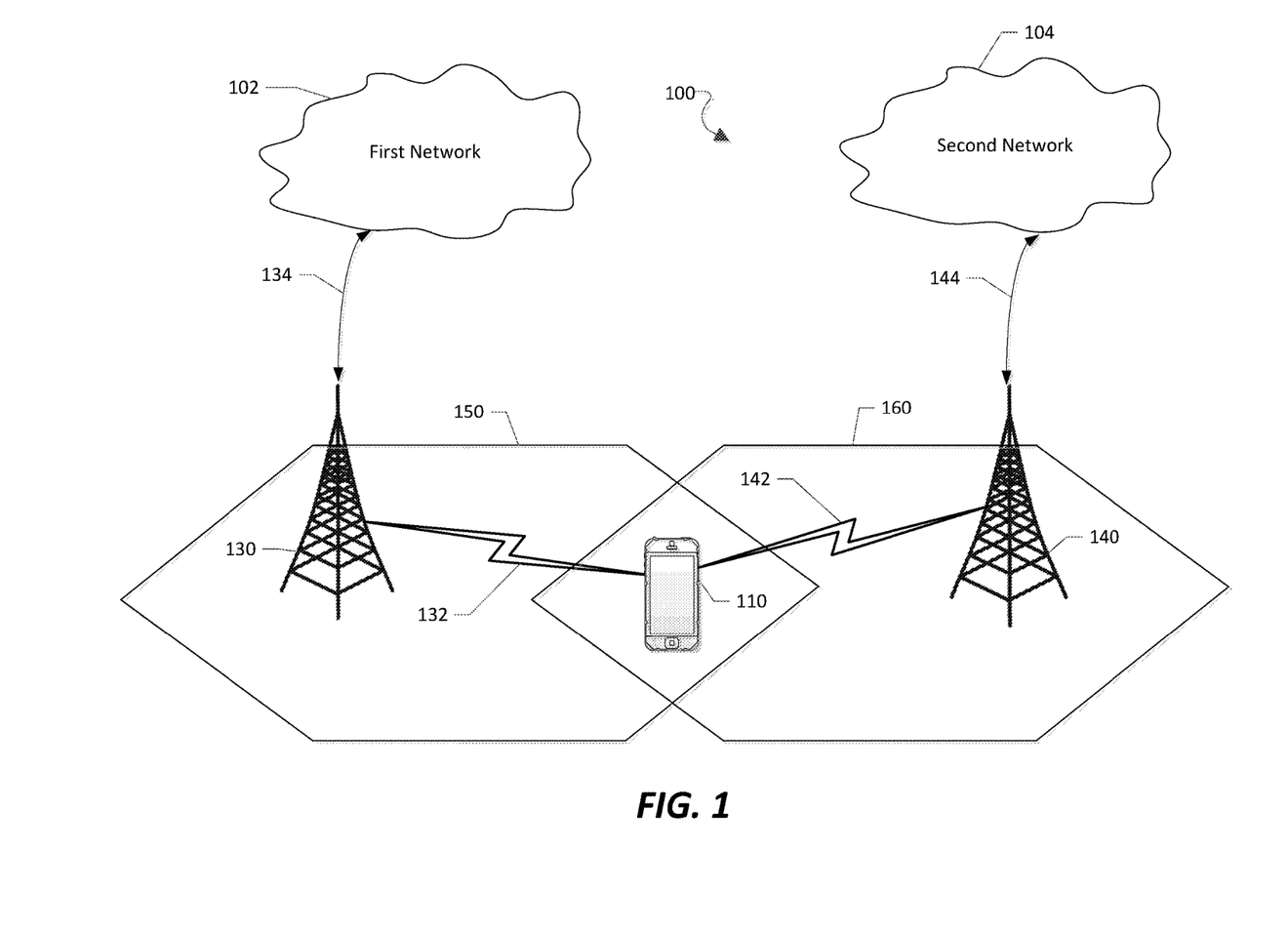
FIG. 1 is a schematic diagram of a communication system in accordance with various examples.

Various examples may be implemented within a communication system 100, an example of which is illustrated in FIG. 1. Referring to FIG. 1, a first network 102 (e.g., a first mobile network) and second network 104 (e.g. a second mobile network) may each associate with a plurality of cellular base stations. For instance, a first base station 130 may provide the first network 102 in a first serving cell 150. A second base station 140 may provide the second network 104 in a second serving cell 160. A wireless communication device 110 may be associated with (within effective boundaries of) the first serving cell 150 and the second serving cell 160.

The first base station 130 may be in communication with the first network 102 over a wired or wireless connection 134. The second base station 140 may be in communication with the second network 104 over a wired or wireless connection 144. The wireless communication device 110 may be in communication with the first network 102 through a first cellular connection 132 to the first base station 130. The first cellular connection 132 may correspond to a first RAT on a first subscription (e.g., over a first SIM) of the wireless communication device 110. The wireless communication device 110 may be in communication with the second network 104 through a second cellular connection 142 to the second base station 140. The second cellular connection 142 may correspond to a second RAT on a second subscription (e.g., over a second SIM) of the wireless communication device 110.

Each of the first cellular connection 132 and second cellular connection 142 may be two-way wireless communication links. Each of the first RAT and second RAT may be, but not limited to, one or more of FDMA, TDMA, CDMA (e.g., EVDO), UMTS (e.g., TDS, WCDMA, LTE, HSDPA, or the like), GSM, 1×, GPRS, Wi-Fi, PCS, and/or another protocol used in a wireless communications network or a data communications network. Illustrating with a non-limiting example, the first RAT may be LTE or LTE/WCDMA, and the second RAT may be WCDMA.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some examples, each of the first base station 130 and the second base station 140 may be an access point, Node B, evolved Node B (eNodeB or eNB), base transceiver station (BTS), or the like.

In various examples, the wireless communication device 110 may be configured to access the first network 102 and the second network 104 by virtue of the multi-SIM and/or multi-mode SIM configuration of the wireless communication device 110. When a SIM corresponding to a subscription is inserted or otherwise provided, the wireless communication device 110 may access the mobile communication network associated with that subscription based on the information stored on the SIM through registrations and call setups.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
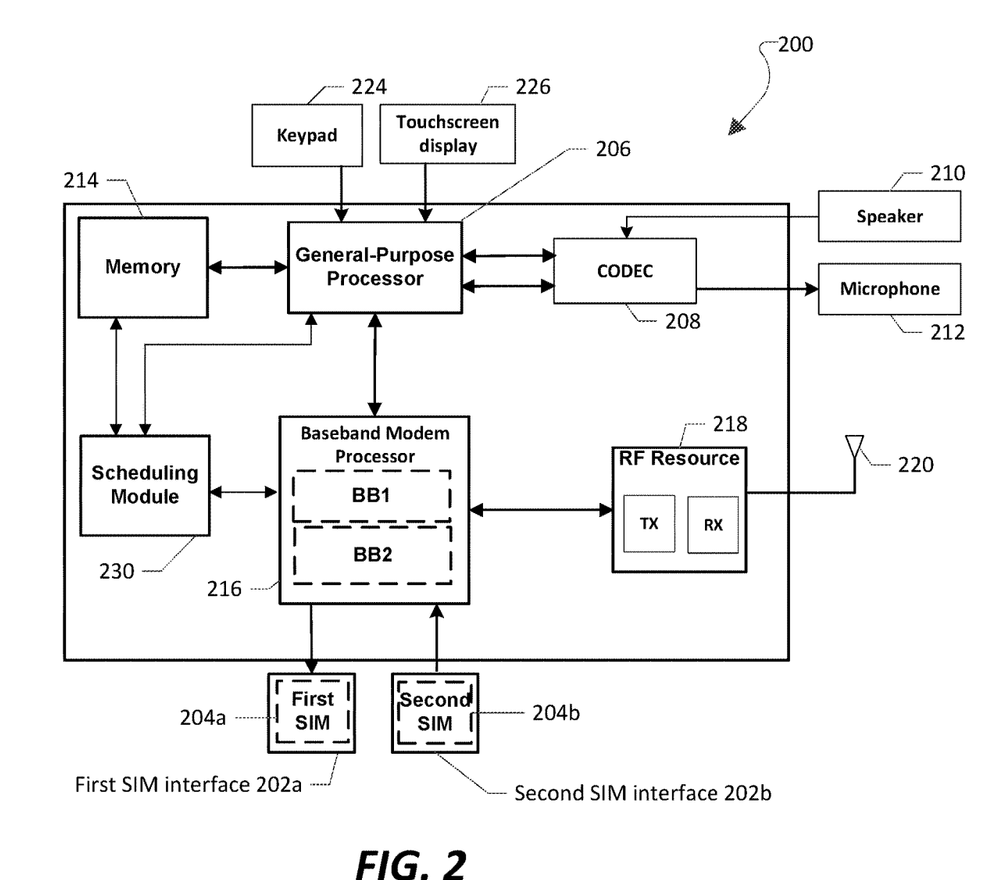
FIG. 2 is a component block diagram of a wireless communication device according to various examples.

FIG. 2 is a functional block diagram of a wireless communication device 200 suitable for implementing various examples. The wireless communication device 200 may be the wireless communication device 110 as described with reference to FIG. 1. Referring to FIGS. 1-2, the wireless communication device 200 may include a first SIM interface 202a, which may receive or otherwise include a first SIM 204a that is associated with the first network 102. The wireless communication device 200 may include a second SIM interface 202b, which may receive or otherwise include a second SIM 204b that is associated with the second network 104.

A SIM (e.g., the first SIM 204a, the second SIM 204b, or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (IC-CID) SIM serial number may be printed on the SIM card for identification. However, a soft SIM or a virtual SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may include a non-transitory processor-readable storage medium that stores processor-executable instructions. For example, the instructions may include routing communication data relating to the first or second SIM though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the first SIM 204a, the second SIM 204b, and/or the like) in the wireless communication device 200 may be associated with at least one baseband-RF resource chain. A baseband-RF resource chain may include the baseband modem processor 216, which may perform baseband/modem functions for communications over the SIMs 204a and 204b. The baseband modem processor 216 may include or may be otherwise coupled to one or more amplifiers and radios, referred to generally herein as RF resource 218 or RF chain.

The RF resource 218 may include at least one transceiver that perform transmit/receive functions for the associated SIMs 204a and 204b of the wireless communication device 200. The RF resource 218 may include separate transmit and receive circuitries, or may include a transceiver that combines transmitter and receiver functions. The RF resource 218 may be coupled to a wireless antenna 220. The RF resource 218 may also be coupled to the baseband modem processor 216.

The examples described herein may be applicable to wireless communication devices in which the SIMs 204a and 204b share a common set of RF resource (particularly, the RF resource 218). Examples described herein may be applicable to wireless communication devices in which each of the SIMs 204a and 204b has a separate RF resource, but activities of one of the SIMs 204a and 204b may be deactivated while the other one of the SIMs 204a and 204b is active.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230. The scheduling module 230 may configure the RF resource 218 to communicate over the first subscription (the first SIM 204a) and the second subscription (the second SIM 204b) in the manner described. For instance, the scheduling module 230 may determine an error rate (e.g., an uplink BLER) associated with the first subscription and/or network congestion (e.g., a number of deactivated HARQ ID) associated with the first network 102. The scheduling module 230 may configure the RF resource 218 to tune from the first subscription to the second subscription for page decodes on the second subscription. Thus, the scheduling module 230 may configure page skipping on the second subscription.

In some examples, the scheduling module 230 may be implemented within the general-purpose processor 206 and/or the baseband modem processor 216. For example, the scheduling module 230 may be implemented as a software application stored within the memory 214 and executed by the general-purpose processor 206 and/or the baseband modem processor 216. Accordingly, such examples can be implemented with minimal additional hardware costs. However, other examples relate to systems and processes implemented with dedicated hardware specifically configured for performing operations described herein with respect to the scheduling module 230. For example, the scheduling module 230 may be implemented as a separate processing component (i.e., separate from the general-purpose processor 206 and the baseband modem processor 216). In such examples, the scheduling module 230 may be coupled to one or more of the memory 214, the general processor 206, the baseband processor 216, or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional networks.

Figure 3:
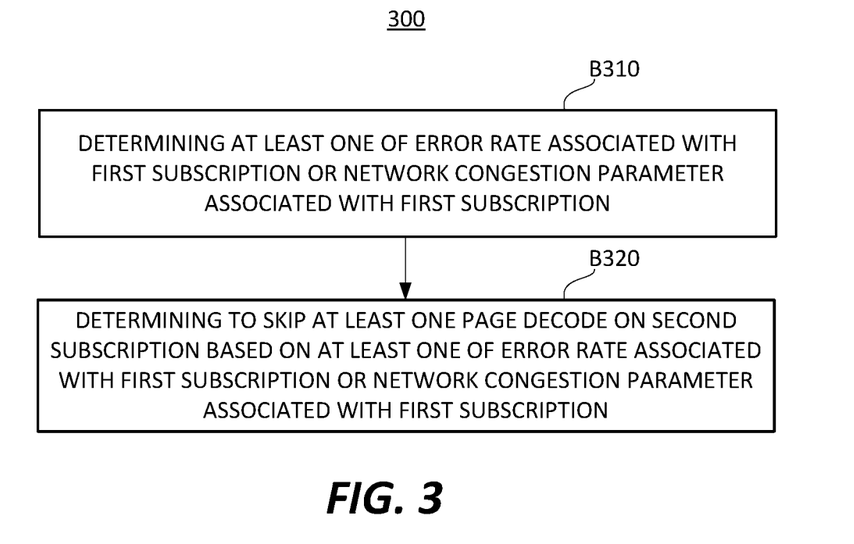
FIG. 3 is a process flowchart diagram illustrating a page decode skipping method according to various examples.

FIG. 3 is a process flowchart diagram illustrating a page decode method 300 according to various examples. Referring to FIGS. 1-3, the scheduling module 230 may perform the page decode method 300 in some examples. The page decode method 300 is concerned with determining channel conditions (e.g., at block B310) with respect to the first subscription (e.g., the first network 102) and configure skipping scheduled page decodes on the second subscription based on the channel conditions of the first network 102 (e.g., at block B320). In some examples, the first subscription is in a connected mode and/or engaged in active data communication. In some examples, the second subscription is in an idle mode and is engaged in idle-mode page decodes based on DRX cycles.

At block B310, the scheduling module 230 may determine at least one of an error rate associated with the first subscription or network congestion parameter associated with the first subscription. In some examples, the error rate is an uplink BLER associated with the first subscription. In some examples, the network congestion parameter is a number of deactivated HARQ IDs deactivated by the first network 102. The first network 102 may determine one or more HARQ IDs (out of 8 total HARQ IDs) to deactivate corresponding to congestion that the first network 102 experiences. The wireless communication device 200 may receive the deactivated HARQ IDs from the first network 102.

While uplink BLER and deactivated HARQ IDs are provided herein as examples of measurements of network conditions, additional or alternative parameters such as, but not limited to, signal strength (e.g., Received Signal Strength Indicator (RSSI), Reference Signal Received Power (RSRP), Reference Signal Received Quality RSRQ), or the like) can be implemented as measurements for channel conditions in a similar manner.

At block B320, the scheduling module 230 may determine to skip at least one page decode on the second subscription based on the at least one of the error rate associated with the first subscription or network congestion parameter associated with the first subscription. In some configurations, APS may be implemented to skip at least one page decode.

Illustrating with a non-limiting example, the scheduling module 230 may determine to skip at least one page decode on the second subscription in response to determining that the error rate associated with the first subscription is below an error rate threshold. Illustrating with another non-limiting example, the scheduling module 230 may determine to skip at least one page decode on the second subscription in response to determining that the network congestion parameter associated with the first subscription is below a network congestion parameter threshold. Illustrating with yet another non-limiting example, the scheduling module 230 may determine to skip at least one page decode on the second subscription in response to determining that the error rate associated with the first subscription is below an error rate threshold and that the network congestion parameter associated with the first subscription is below a network congestion parameter threshold.

Figure 4A:
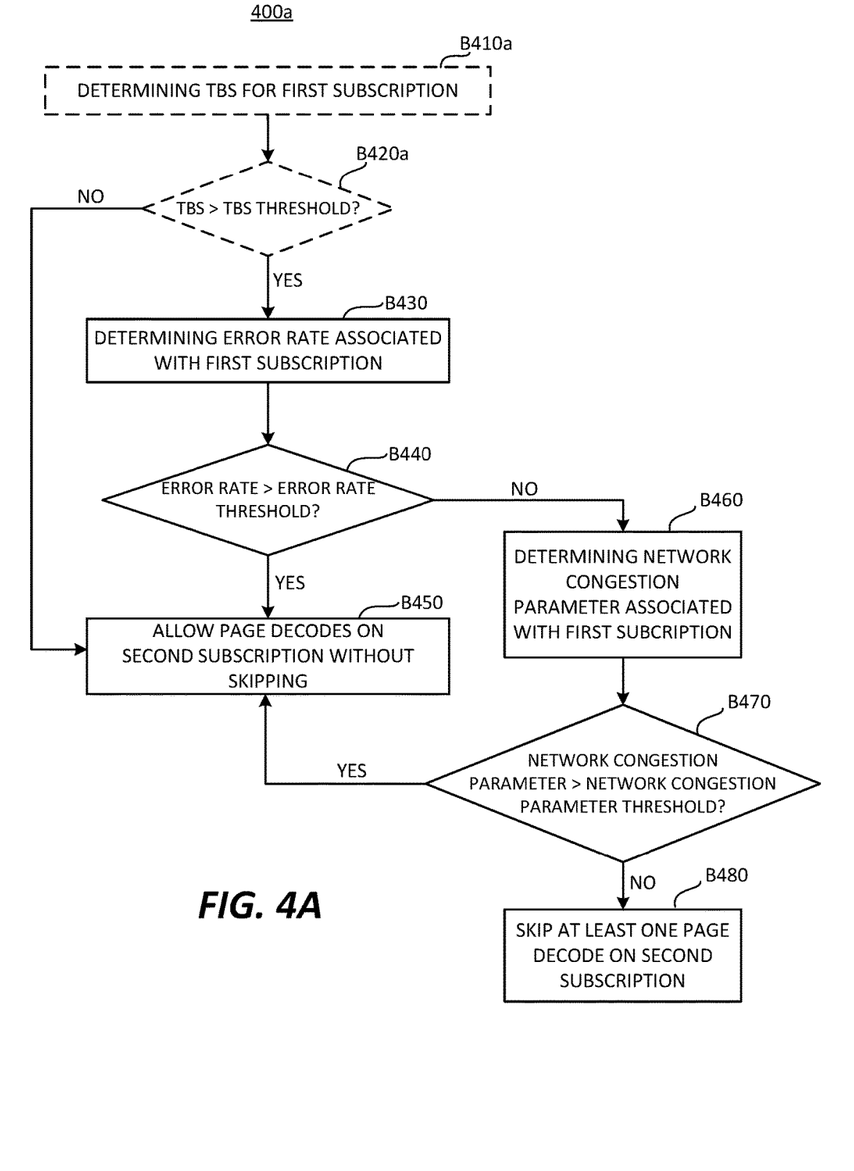
FIG. 4A is a process flowchart diagram illustrating a page decode skipping method according to various examples.

FIG. 4A is a process flowchart diagram illustrating a page decode method 400a according to various examples. Referring to FIGS. 1-4A, the page decode method 400a may be a particular implementation of the page decode method 300. Thus, one or more of blocks B410a-B480) correspond to one or more of blocks B310 and B320. The scheduling module 230 may perform the page decode method 400a in some examples. The page decode method 400a is concerned with determining whether the first subscription needs additional uplink data throughput (e.g., at blocks B410a and B420a), determining channel conditions with respect to the first subscription (e.g., the first network 102) (e.g., at blocks B430, B440, B460, and B470), and configuring skipping scheduled page decodes on the second subscription based on the channel conditions of the first network 102 (e.g., at block B480). In some examples, the first subscription is in a connected mode and/or engaged in active data transfer. In some examples, the second subscription is in an idle mode and has idle-mode page decodes scheduled based on DRX cycles.

At block B410a, the scheduling module 230 may determine the TBS for the first subscription. The TBS may be determined at the Media Access Control (MAC)/L2 layer. The scheduling module 230 may query the MAC/L2 layer or the physical layer for the uplink TBS . Larger uplink TBS may indicate additional data throughput. At block B420a, the scheduling module 230 may determine whether the TBS exceeds a TBS threshold. In response to determining that the TBS does not exceed the TBS threshold (B420a:NO), the scheduling module 230 may allow all scheduled page decodes on the second subscription without skipping, at block B450.

On the other hand, in response to determining that the TBS exceeds the TBS threshold (B420a:YES), the scheduling module 230 may determine an error rate associated with the first subscription, at block B430. For instance, the scheduling module 230 may determine the uplink BLER experienced by the first subscription. At block B440, the scheduling module 230 may determine whether the error rate exceeds an error rate threshold (e.g., a BLER threshold). Examples of the BLER threshold include, but not limited to, 1%, 2%, 5%, 10%, 15%, 20%, and the like. In response to determining that the error rate exceeds the error rate threshold (B440:YES), the scheduling module 230 may allow all scheduled page decodes on the second subscription without skipping, at block B450.

On the other hand, in response to determining that the error rate does not exceed the error rate threshold (B440: NO), the scheduling module 230 may determine the network congestion parameter associated with the first subscription, at block B460. For instance, the scheduling module 230 may determine the number of deactivated HARQ IDs deactivated by the first network 102. The wireless communication device 200 may receive the deactivated HARQ IDs from the first network 102.

At block B470, the scheduling module 230 may determine whether the network congestion parameter exceeds a network congestion parameter threshold (e.g., a number of deactivated HARQ ID threshold). Examples of the number of deactivated HARQ ID threshold) include, but not limited to, 1, 2, 3, 4, 5, 6, or 7. In response to determining that the network congestion parameter exceeds the network congestion parameter threshold (B470:YES), the scheduling module 230 may allow all scheduled page decodes on the second subscription without skipping, at block B450.

On the other hand, in response to determining that the network congestion parameter does not exceed the error rate threshold (B470:NO), the scheduling module 230 may skip at least one page decode on the second subscription, at block B480. APS may be implemented to skip the at least one page decode.

Figure 4B:
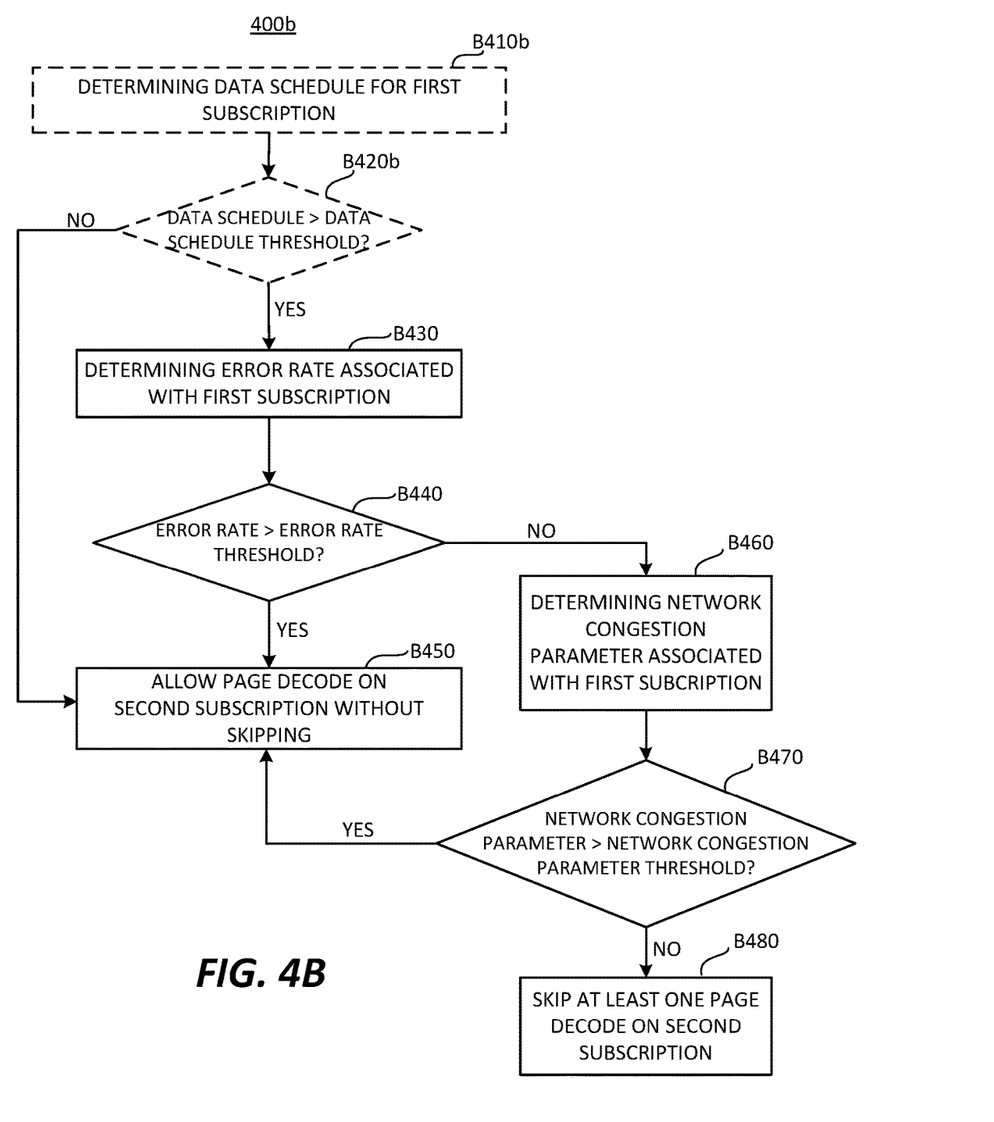
FIG. 4B is a process flowchart diagram illustrating a page decode skipping method according to various examples.

FIG. 4B is a process flowchart diagram illustrating a page decode method 400b according to various examples. Referring to FIGS. 1-4B, the page decode method 400b may be a particular implementation of the page decode method 300. Thus, one or more of blocks B410b-B480) correspond to one or more of blocks B310 and B320. The method 400b may be alternative to the method 400a in that blocks B410b and B420b relate to a different implementation to determine that the first subscription needs additional uplink data throughput. The scheduling module 230 may perform the page decode method 400b in some examples. In some examples, the first subscription is in a connected mode and/or engaged in active data transfer. In some examples, the second subscription is in an idle mode and has idle-mode page decodes scheduled based on DRX cycles.

At block B410b, the scheduling module 230 may determine the (downlink) data schedule for the first subscription. The data schedule may be received from the first network 102 and may be a schedule by which the first network 102 sends the downlink data to the wireless communication device 200. At block B420b, the scheduling module 230 may determine whether the data schedule exceeds a data schedule threshold. Examples of the data schedule threshold include, but not limited to, 5%, 10%, 20%, 25%, or the like. In response to determining that the data schedule exceeds the data schedule threshold (B420b:YES), the method 400b proceeds to block B430. On the other hand, in response to determining that the data schedule does not exceed the data schedule threshold (B420b:NO), the method 400b proceeds to block B450. Blocks B430-B480 are executed in a manner consistent with the method 400a.

While the determination relative to the error rate (e.g., blocks B430-B440) is made before the determination relative to the network congestion parameter (e.g., blocks B460-B470), one of ordinary skill in the art can appreciate that the determination relative to the network congestion parameter may be made before the determination relative to the error rate in other examples.

In some examples, one of the error rate (e.g., blocks B430-B440) or the network congestion parameter (e.g., blocks B460-B470) is considered, instead of both. For instance, in the examples in which only the error rate is considered, blocks B460 and B470 are omitted and block B480 is executed in response to block B440:NO. Similarly, in the examples in which only the network congestion parameter is considered, blocks B430 and B440 are omitted and block B460 is executed in response to B420a:YES or B420b:YES.

While uplink TBS and downlink data schedule are described relative to methods 400a and 400b, respectively, additional or alternative conditions for determining that additional data throughput is needed for the first subscription can be likewise implemented. Illustrating with a non-limiting example, in response to B420a:YES or B420b:YES, the scheduling module 230 may determine a length of the DRX cycle of the second subscription. In response to determining that the length of the DRX cycle of the second subscription being below a threshold (e.g., 640 ms for WCDMA as the second RAT), block B430 may be executed. On the other hand, in response to determining that the length of the DRX cycle of the second subscription is not below the threshold, block B450 may be executed.

Figure 5:
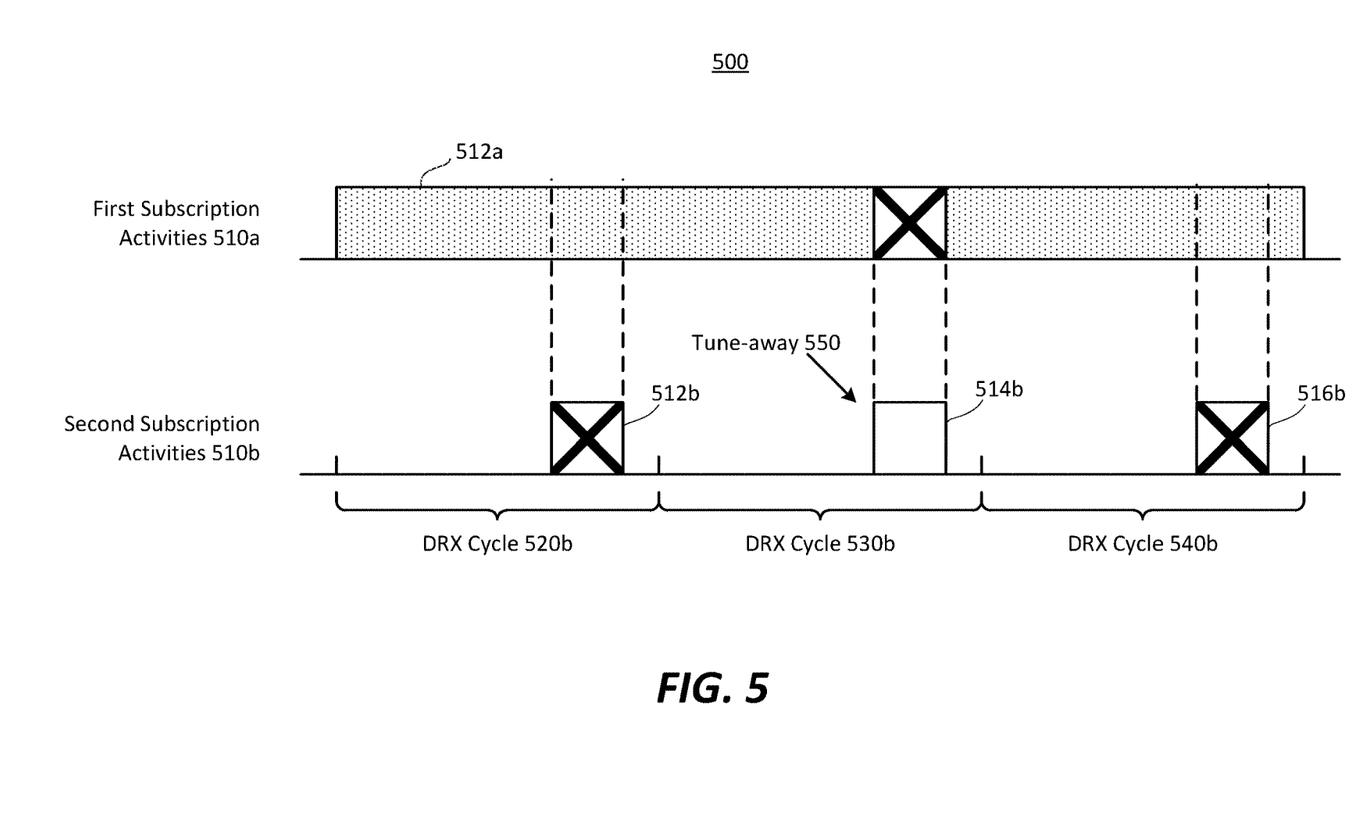
FIG. 5 is a diagram illustrating a page decode skipping scheme according to various examples.

FIG. 5 is a diagram illustrating a page decode skipping scheme 500 according to various examples. Referring to FIGS. 1-5, the diagram 500 illustrates a manner in which the at least one page decode is skipped (e.g., at block B480). The diagram 500 may correspond to an APS scheme in which one scheduled page decode is skipped in every other DRX cycle. First subscription activities 510a may refer to active data transfer or connected-mode communication over the first SIM 204a, as denoted by 512a. The first subscription activities 510a may include one or more of uplink activities (e.g., transmission) or downlink activities (e.g., reception). The first subscription activities 510a may be communicated over the RF resource 218. Second subscription activities 510b may refer to scheduled idle-mode activities (e.g., page decodes 512b, 514b, and 516b). One of the page decodes 512b, 514b, and 516b may be scheduled for each of the DRX cycles 520b, 530b, and 540b, respectively. The DRX cycles 520b, 530b, and 540b may be consecutive DRX cycles as shown.

Upon determination that the network congestion parameter does not exceed the network congestion parameter threshold and that the error rate does not exceed the error rate threshold, the at least one page (e.g., the page 512b in the DRX cycle 520b and the page 516b in the DRX cycle 540b) may be skipped. The page 514b in the DRX cycle 530b may not be skipped. The scheduling module 230 may allow the RF resource 218 to be tuned to the first subscription during the time interval of the pages 512b and 516b, given that the pages 512b and 516b are skipped. The scheduling module 230 may tune the RF resource 218 away from the first subscription to the second subscription for receiving and decoding the page 514b at tune-away 550.

In some examples, the page decode skipping scheme 500 may be determined based on one or more of the error rate or network congestion parameter. Whereas the error rate and/or the network congestion parameter indicate unfavorable channel conditions for the first subscription, the scheduled page decodes on the second subscription may be skipped less frequently. Illustrating with a non-limiting example in which a scheduled page decode is skipped one of every N number of DRX cycles, the number N may increase as the uplink BLER and/or the number of deactivated HARQ IDs increase.

Figure 6:
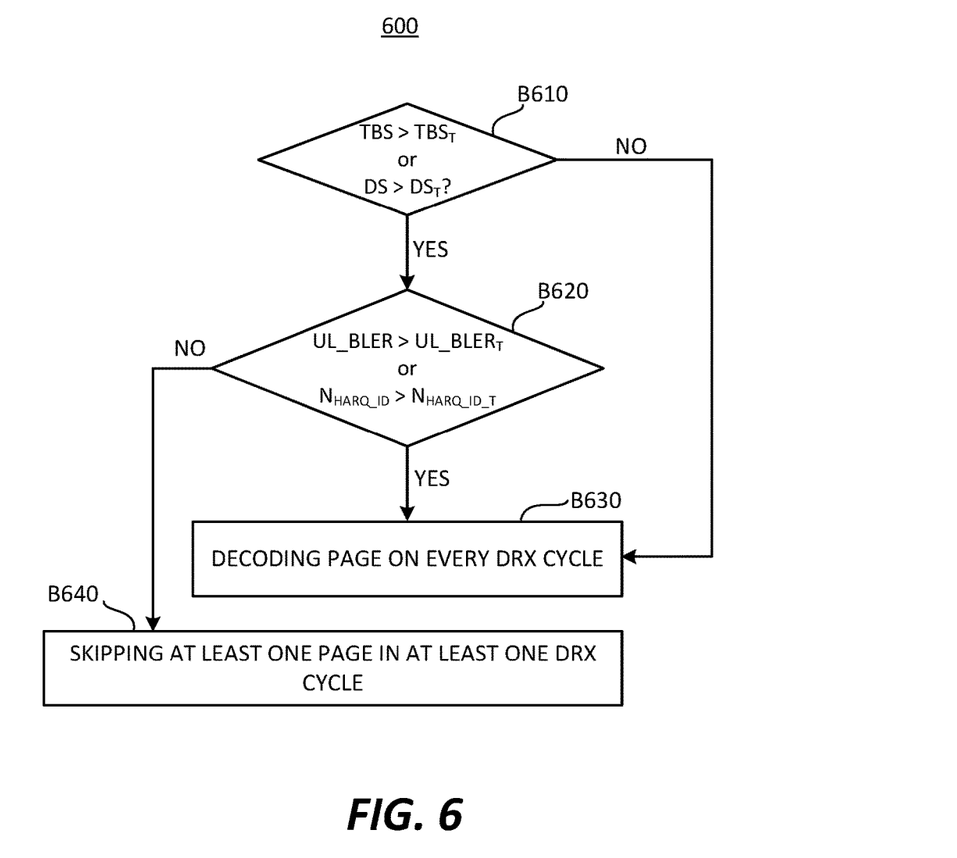
FIG. 6 is a process flowchart diagram illustrating a page decode skipping method according to various examples.

FIG. 6 is a process flowchart diagram illustrating a page decode method 600 according to various examples. Referring to FIGS. 1-6, the page decode method 600 may be a particular implementation of the page decode method 300.

Thus, one or more of blocks B610-B640 correspond to one or more of blocks B310 and B320. In addition, one or more of blocks B610-B640 may correspond to one or more of blocks B410a-B480 and/or one or more of blocks B410b-B480. The scheduling module 230 may perform the page decode method 600 in some examples. In some examples, the first subscription is in a connected mode and/or engaged in active data transfer. In some examples, the second subscription is in an idle mode and has idle-mode page decodes scheduled based on DRX cycles.

At block B610, the scheduling unit 230 determines whether an uplink TBS associated with the first subscription exceeds a TBS threshold ($TBS_T$) or whether data schedule (DS) associated with the first subscription exceeds a data schedule threshold ($DS_T$). In response to determining that TBS does not exceed $TBS_T$ and DS does not exceed $DS_T$ (B610:NO), the scheduling unit 230 may configure the RF resource 218 to decode the page on every DRX cycle for the second subscription without skipping at block B630. That is, the scheduling unit 230 may tune the RF resource 218 away from the first subscription to the second subscription for all scheduled page decodes.

On the other hand, in response to determining that TBS exceeds $TBS_T$ or DS exceeds $DS_T$ (B610:YES), the scheduling unit 230 determines whether an uplink BLER (UL_BLER) associated with the first subscription exceeds an uplink BLER threshold (UL_$BLER_T$) or whether a number of deactivated HARQ IDs (NHARQ_ID) associated with the first network 102 exceeds a number of deactivated HARQ IDs threshold (NHARQ_ID_T) at block B620. In response to determining that UL_BLER exceeds UL_BLERT or NHARQ_ID exceeds NHARQ_ID_T (B620:YES), the scheduling unit 230 may configure the RF resource 218 to decode the page on every DRX cycle for the second subscription without skipping at block B630.

On the other hand, in response to determining that UL_BLER does not exceed UL_$BLER_T$ and $N_{HARQ\_ID}$ does not exceed $N_{HARQ\_ID\_T}$ (B620:NO), the scheduling unit 230 may configure the RF resource 218 to skip at least one page associated with the second subscription in at least one DRX cycle in the manner described.

Figure 7:
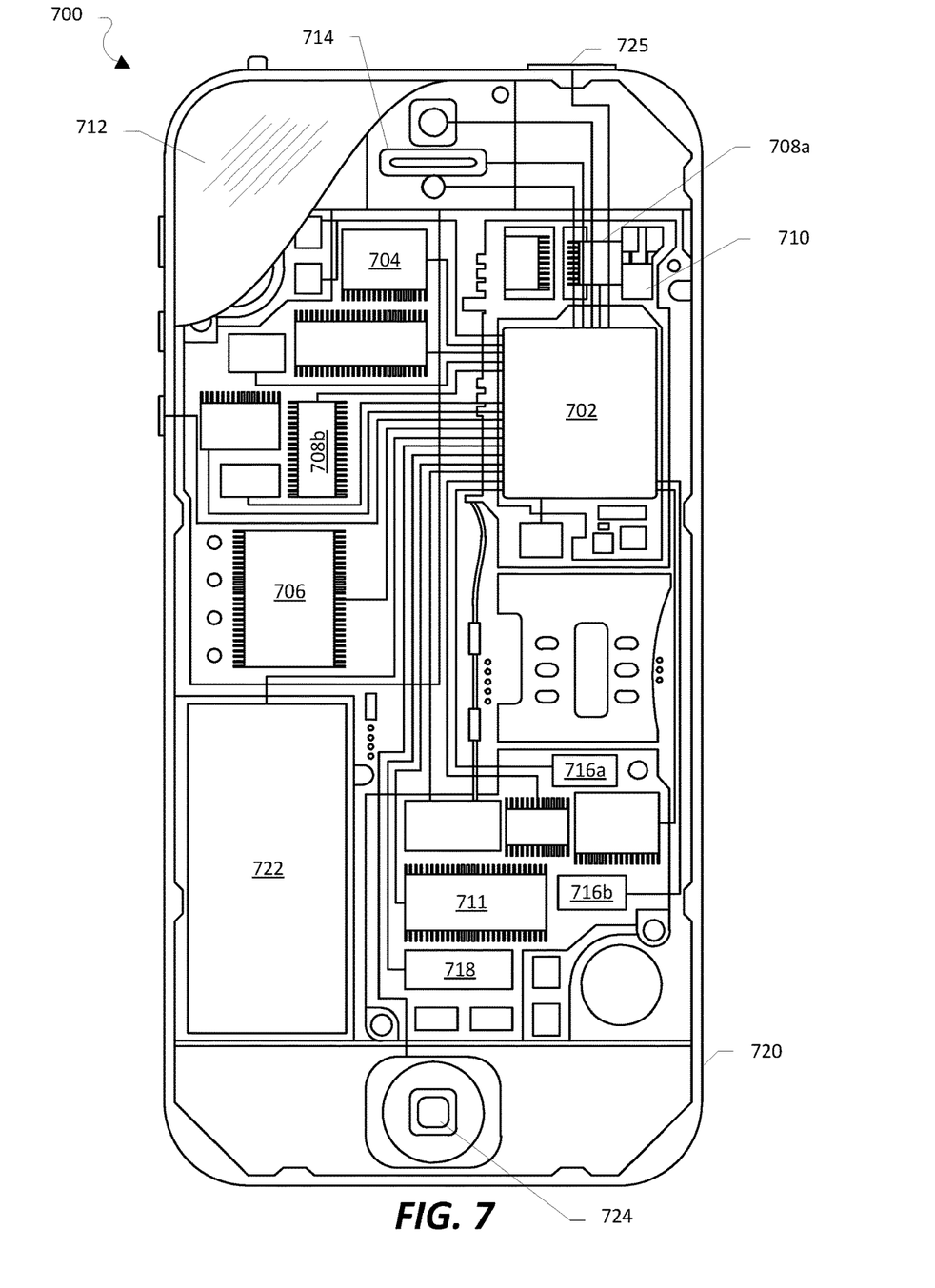
FIG. 7 is a component block diagram of a wireless communication device suitable for use with various examples.

The various examples may be implemented in any of a variety of wireless communication devices 110 and 200, an example of which is illustrated in FIG. 7, as wireless communication device 700. As such, the wireless communication device 700 may implement the process and/or the apparatus of FIGS. 1-6, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to at least one antenna 710 and adapted for sending and receiving cellular communications. The transceivers 708a, 708b and antenna 710 may be used with the above-mentioned circuitry to implement the various example methods. The cellular network transceivers 708a, 708b may be the RF resource 218. The antenna 710 may be the antenna 220. The wireless communication device 700 may include two or more SIM cards 716a, 716b, corresponding to The first SIM 204a (first SIM 401) and The second SIM 204b (second SIM 402), coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly adapted to accept one type of connection, or multiply adapted to accept various types of physical and communication connections, common or proprietary, such as USB, FireWire, Thunderbolt, or PCIe. The peripheral device connection interface 718 may also be coupled to a similarly adapted peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off The various examples illustrated and described are provided merely as examples to illustrate various features of the claims. However, features shown and described with respect to any given example are not necessarily limited to the associated example and may be used or combined with other examples that are shown and described. Further, the claims are not intended to be limited to any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for managing communications by a wireless communication device, the method comprising:
   determining a network congestion parameter associated with a first subscription enabled by a first Subscriber Identity Module (SIM), wherein the network congestion parameter includes a number of deactivated Automatic Repeat Request Identification(s) (ID(s)) deactivated by a first network associated with the first subscription; and
   skipping at least one page decode associated with a second subscription enabled by a second SIM based at least in part on the network congestion parameter.

2. The method of claim 1, wherein determining the network congestion parameter associated with the first subscription further comprises:
   receiving the deactivated HARQ ID(s) from the first network.

3. The method of claim 1, wherein:
   the first subscription is in a connected mode; and
   the second subscription is an idle mode.

4. The method of claim 1, wherein the first subscription and the second subscription share a Radio Frequency (RF) resource of the wireless communication device.

5. The method of claim 1, wherein skipping the at least one page decode associated with the second subscription comprises:
   skipping the page decode associated with the second subscription in response to determining that the network congestion parameter associated with the first subscription is below a network congestion parameter threshold.

6. The method of claim 1, wherein the network congestion parameter associated with the first subscription is determined in response to determining that an uplink Transport Block Size (TBS) associated with the first subscription crosses an uplink TBS threshold.

7. The method of claim 1, wherein the network congestion parameter associated with the first subscription is determined in response to determining that a data schedule associated with the first subscription crosses a data schedule threshold.

8. The method of claim 1, wherein skipping the at least one page decode associated with the second subscription based at least in part on the network congestion parameter comprises:
   skipping at least one page decode scheduled in at least one Discontinuous Reception (DRX) cycle of the second subscription.

9. The method of claim 1, further comprising:
   allowing page decodes associated with the second subscription without skipping in response to determining that the network congestion parameter associated with the first subscription exceeds a network congestion parameter threshold.

10. A wireless communication device, comprising:
    at least one radio frequency (RF) resource;
    a first Subscriber Identity Module (SIM) associated with a first radio access technology (RAT);
    a second SIM associated with a second RAT;
    a processor;
    a memory storing instructions that, when executed by the processor, cause the wireless communication device to:
       determine a network congestion parameter associated with a first subscription enabled by the first SIM, wherein the network congestion parameter includes a number of deactivated Automatic Repeat Request (HARQ) Identification(s) (ID(s)) deactivated by a first network associated with the first subscription; and skip at least one page decode associated with a second subscription enabled by the second SIM based at least in part on the network congestion parameter.

11. The wireless communication device of claim 10, wherein execution of the instructions to determine the network congestion parameter causes the wireless communication device to further:

receive the deactivated HARQ ID(s) from the first network.

12. The wireless communication device of claim 10, wherein:

the first subscription is in a connected mode; and
the second subscription is an idle mode.

13. The wireless communication device of claim 10, wherein the first subscription and the second subscription share a RF resource of the wireless communication device.

14. The wireless communication device of claim 10, wherein execution of the instructions to skip the at least one page decode associated with the second subscription causes the wireless communication device to further:

determine that the network congestion parameter associated with the first subscription is below a network congestion parameter threshold.

15. The wireless communication device of claim 10, wherein execution of the instructions causes the wireless communication device to further:

determine an uplink Transport Block Size (TBS) associated with uplink activities of the first subscription; or
determine a data schedule associated with downlink activities of the first subscription.

16. The wireless communication device of claim 15, wherein the network congestion parameter associated with the first subscription is determined in response to determining that the uplink TBS associated with the first subscription crosses an uplink TBS threshold.

17. The wireless communication device of claim 15, wherein the network congestion parameter associated with the first subscription is determined in response to determining that the data schedule associated with the first subscription crosses a data schedule threshold.

18. The wireless communication device of claim 10, wherein execution of instructions to skip the at least one page decode on the second subscription based at least in part on the network congestion parameter associated with the first subscription causes the wireless communication device to further:

skip at least one page decode scheduled in at least one Discontinuous Reception (DRX) cycle of the second subscription.

19. The wireless communication device of claim 10, wherein execution of the instructions causes the wireless communication device to further:

allow page decodes on the second subscription without skipping in response to determining that the network congestion parameter associated with the first subscription exceeds a network congestion parameter threshold.

20. A wireless communication device comprising:

means for determining a network congestion parameter associated with a first subscription enabled by a first Subscriber Identity Module (SIM), wherein the network congestion parameter includes a number of deactivated Automatic Repeat Request Identification(s) (ID(s)) deactivated by a first network associated with the first subscription; and means for skipping at least one page decode associated with a second subscription enabled by a second SIM based at least in part on the network congestion parameter.

21. A non-transitory computer-readable medium comprising computer-readable instructions such that, when executed by a processor of a wireless communication device, cause the wireless communication device to:

determine a network congestion parameter associated with a first subscription enabled by a first Subscriber Identity Module (SIM), wherein the network congestion parameter includes a number of deactivated Automatic Repeat Request Identification(s) (ID(s)) deactivated by a first network associated with the first subscription; and skip at least one page decode associated with a second subscription enabled by a second SIM based at least in part on the network congestion parameter.

* * * * *